United States Patent Office 3,484,422
Patented Dec. 16, 1969

3,484,422
SOLVENT EXTRACTION OF DRIPOLENE FRACTIONS TO YIELD POLYMERIZABLE AROMATIC MONOMER MIXTURES AND SOLID RESIN PRODUCTS THEREFROM
Frank Scardiglia, Arlington Heights, and Takeo Hokama, Chicago, Ill., assignors to Velsicol Chemical Corporation, Chicago, Ill., a corporation of Illinois
No Drawing. Filed Nov. 16, 1966, Ser. No. 594,653
Int. Cl. C08f *15/42, 19/00*
U.S. Cl. 260—82                              14 Claims

ABSTRACT OF THE DISCLOSURE

A process for the recovery of dicyclopentadiene and the production of resinous products from a feed stream containing from about 5 to about 50 weight percent of dicyclopentadiene and from about 5 to about 50 weight percent of aromatic olefins which comprises contacting said stream with a sulfolane selected from the group consisting of sulfolane and alkyl substituted sulfolanes and an aliphatic solvent having a boiling point of less than about 140° C., recovering the dicyclopentadiene from the aliphatic solvent and polymerizing the aromatic olefin fraction into resinous product.

---

This invention relates to the fractional liquid extraction of dicyclopentadiene from a stream containing a multiplicity of aromatic olefinic compounds. In particular this invention relates to an extraction using sulfolanes and an aliphatic solvent to recover high percentages of the available dicyclopentadiene and to further obtain an aromatic olefinic fraction useful in the production of resinous products.

In the past a variety of procedures have been proposed and used to recover dicyclopentadiene from streams also containing aromatic olefins. These procedures essentially involve a variety of distillation and/or heat treatments.

One known procedure involves heating the feed stream in the vapor state to a substantial temperature so as to dedimerize the dicyclopentadiene followed by further distillation of the product to recover the cyclopentadiene. Unfortunately this procedure allows for a normal recovery of the available dicyclopentadiene of about 70%. Not only does this procedure result in a loss of substantial quantities of available dicyclopentadiene but it also results in a by-product stream containing polymeric products, dicyclopentadiene and other contaminates interfering with the quality of resin products prepared therefrom.

A second available procedure is by distillation of the stream. This procedure is not practical due to the similarity of the boiling points of the various components, i.e. dicyclopentadiene, methyl styrene, styrene, vinyl toluene and indene. It is further complicated by the equilibrium between cyclopentadiene and dicyclopentadiene.

It is therefore an object of the present process to devise a process for the recovery of dicyclopentadiene, particularly from streams containing aromatic olefins.

An additional object of the present invention is to devise a process for the recovery of the maximum amount of the available dicyclopentadiene from dripolene derived streams.

Still another object of the present invention is the substantial removal of dicyclopentadiene from streams containing polymerizable aromatic compounds.

Still another object of the present invention is the preparation of improved resinous products from aromatic olefins from streams also containing dicyclopentadiene.

Other objects of the present invention will become apparent from the ensuing description.

It has now been found that there can be recovered from streams containing from about 5 to about 50 weight percent dicyclopentadiene and from about 5 to about 50 weight percent aromatic olefinic compounds, a minimum of 95 weight percent of the dicyclopentadiene present in the stream. By the present process utilizing sulfolanes and an aliphatic solvent having a boiling point of less than 140° C. there is also obtained a desirable aromatic olefin fraction. Not only does this permit maximum utilization of the dicyclopentadiene available in the feed stream, it also provides a mixture of aromatic olefins substantially free of dicyclopentadiene and useful for a variety of purposes, particularly in the production of resinous products by thermal and catalytic procedures.

It has now been determined that sulfolane and alkyl substituted sulfolanes can be used to separate and recover dicyclopentadiene from a feed stream containing aromatic olefins. In addition to providing an economic procedure for obtaining dicyclopentadiene, this process provides an olefinic product substantially free of dicyclopentadiene.

In essence this present process comprises contacting a feed stream containing from about 5 to about 50 weight percent dicyclopentadiene and from about 5 to about 50 weight percent aromatic olefins with the sulfolane and aliphatic compounds having a boiling point of less than about 140° C. This process permits the ready recovery of the dicyclopentadiene from the aliphatic solvent phase, whereas the aromatic olefins are recoverable from the sulfolane.

The present process contemplates the use of sulfolane and alkyl substituted sulfolanes. Alkyl substituted sulfolanes are sulfolane compounds wherein one or more of the hydrogen atoms is replaced by an alkyl radical. For economic reasons it is preferred that the alkyl substituents contain up to about 12 carbon atoms, preferably that the substituents be lower alkyl radicals.

Dicyclopentadiene recovery of a minimum of 95 weight percent of that available in the feed streams is readily obtained. Normally this recovery will be from about 97 to 99 weight percent of the available dicyclopentadiene.

Similarly the sulfolane will contain a minimum of 90 percent by weight of the aromatic olefins available in the feed. Of particular value is the substantial absence of dicyclopentadiene in this mixture; the dicyclopentadiene content being a maximum of about 3% by weight of the extracted compounds. This permits the production of desirable resinous products not previously attainable from this feed stream by the other known procedures for the removal and recovery of dicyclopentadiene.

This process can be performed by using standard operating procedures for liquid-liquid extractions, particularly for fractional liquid extractions with two solvents. This extraction can be conveniently performed in a counter-current extraction column. In the column the feed enters in the center of the column whereas the respective solvents enter at opposite ends and flow counter to each other. The number of stages in the extraction column must be determined for each system.

The feed stream for the present process can be obtained from various sources. It can contain a multiplicity of components without interfering with the operation of the process. One principal source for this type of feed stream are the dripolenes, obtained from the high temperature pyrolysis of normally gaseous hydrocarbons. United States Letters Patents Nos. 2,798,866 and 2,798,867 describe dripolenes and state typical properties and composition. This dripolene fraction is then preferably subjected to distillation so as to remove substantially all of the toluene and components boiling lower than toluene.

Other sources of feed streams of the above description can be used in this process provided that they have the dicyclopentadiene and aromatic olefin content. The source of the feed will not affect the operation of the process.

It has been found that advantage can be had by incorporating minor amounts of water into the sulfolane. Varying amounts of water can be used. Amounts of water of from about 2 to about 15 volume percent of the sulfolane are of value.

The ratio of solvents and feed useful for the successful operation will vary with the actual composition of the feed, identity of the aliphatic solvent, efficiency of the extraction equipment and the other variables of the process. It has been found that volume ratios of an aqueous sulfolane to the feed stream of between about 1:1 and 10:1 can be used. The use of additional solvent will not materially impair the extraction but it will lower the capacity of the extraction equipment and the final recovery equipment. Similarly volume ratios of the aliphatic solvent to the feed stream of between about 0.4:1 and 10:1 can be used. While the use of additional quantities of solvent is not necessary it does not adversely affect the operation of the present process.

The aliphatic solvents useful in the present process can be substituted or unsubstituted, a single compound or a mixture of compounds provided that it has a boiling point below about 140° C. Since there is no need to use substituted aliphatic compounds for this purpose, the paraffins such as heptanes, hexanes and pentanes are preferred due to their availability, low cost and solubility characteristics. Other aliphatic compounds, including branched, cyclic and alkylcyclic compounds and mixtures thereof, having boiling points lower than about 140° C., such as cyclopentane, cyclohexane, methylcyclopentane, etc. can be used.

One of the advantages of the present process is that it can be readily used at ambient temperatures. While elevated temperatures can be used, there is no need to do so and therefore it is preferred not to use elevated temperatures.

Upon the completion of the extraction the dicyclopentadiene can be recovered from the aliphatic hydrocarbons by known procedures. This could consist of removing the aliphatic solvents by distillation followed by thermal treatment of the bottoms at a temperature between about 150° C. and about 400° C. to dedimerize the dicyclopentadiene to the cyclopentadiene monomer which is recovered as an overhead fraction. Prior to removal of aliphatic solvent the dicyclopentadiene solution may be washed with water to remove traces of the sulfolane. The aliphatic solvent can then be recycled for use in the extraction. The sulfolane can be separated from the aromatic olefins by extraction with water. The sulfolane is recycled after concentration for further use in the extraction process and the aromatic olefin fraction can be used in the preparation of excellent resin products as will be described subsequently.

The following examples illustrate the performance of the present extraction process but the present process is not limited thereto.

In the extractions set forth in these examples, an 18 stage York-Scheibel counter-current extraction unit was used. Hexane was used as the aliphatic solvent and entered the extraction unit below the first stage and was removed from the column at a point above the 18th stage. The sulfolane was pumped into the unit at a point above the 18th stage and removed at a point below the first stage. The feed stream in each instance was obtained by distillation of a dripolene to substantially remove the toluene and all components having a boiling point lower than toluene. The feed content as analyzed by gas chromatographic analyses in weight percent was as follows:

| Component | Wt. % |
|---|---|
| Cyclopentadiene | 27.7 |
| Methyl cyclopentadiene | 4.5 |
| Toluene | 2.8 |
| Non-aromatics ($C_6$–$C_8$) | 0.8 |
| Ethyl benzene | 1.7 |
| Xylenes | 2.6 |
| Propyl benzene | 1.4 |
| Styrene | 14.8 |
| Methyl ethyl benzene | 0.8 |
| Methyl styrene | 0.8 |
| Unknown | 0.4 |
| Vinyl toluene | 1.6 |
| Indene | 4.8 |
| Unknown | 2.1 |
| Naphthalene | 5.9 |
| Compounds boiling higher than naphthalene | 27.3 |

The material balance for this work are as follows:

| Example | Feed (grams) | Sulfolane in (grams) | Hexane in (grams) | Hexane solution out | Sulfolane solution out |
|---|---|---|---|---|---|
| 1 | 329 | 2,470 | 468 | 680 | 2,475 |
| 2 | 986 | 2,620 | 239 | 896 | 2,780 |

In Example 1, the sulfolane contained 7 weight percent water, while in Example 2 the sulfolane contained 5 percent water. The hexane solution was recovered from the top of the extraction column and the hexane removed by distillation through a bubble cap distillation column at 100° C. pot temperature and an initial pressure of 750 mm. Hg and a final pressure of 300 mm. Hg. The concentrate was analyzed by gas chromatography. The sulfolane solution was recovered from the bottom of the extraction column, diluted with water and extracted with benzene. The benzene layer was separated from the aqueous phase and analyzed by gas chromatography. The results of the gas chromatographic analysis are as follows:

| Component | Example 1 Sulfolane fraction Wt. percent | Example 1 Hexane fraction Wt. percent | Example 2 Sulfolane fraction Wt. percent | Example 2 Hexane fraction Wt. percent |
|---|---|---|---|---|
| Cyclopentadiene | 0.3 | 25.8 | 1.7 | 30.6 |
| Methyl cyclopentadiene | 0.1 | 6.8 | 0.1 | 3.3 |
| Toluene | 1.6 | 2.3 | 2.1 | 1.7 |
| Non-aromatics ($C_6$–$C_8$) | 0 | 0 | 0 | 0 |
| Ethyl benzene | 0.2 | 1.7 | 0.5 | 1.4 |
| Xylenes | 0.3 | 2.6 | 0.8 | 2.3 |
| Propyl benzenes | 0.2 | 1.5 | 0.1 | 1.3 |
| Styrene | 15.3 | 4.4 | 23.5 | 5.4 |
| Methyl ethyl benzene | 0 | 0.4 | 0.2 | 0.9 |
| Methyl styrenes | 0.3 | 0.5 | 0.6 | 1.6 |
| Unknown | 0.3 | 1.0 | 0.4 | 1.8 |
| Vinyl toluenes | 0.5 | 1.2 | 0.8 | 1.5 |
| Indene | 4.6 | 0.8 | 7.3 | 1.6 |
| Unknown | 4.6 | 1.3 | 0.8 | 1.5 |
| Naphthalene | 4.7 | | 13.0 | 0.9 |
| Compounds boiling higher than naphthalene | 67.0 | 49.7 | 48.1 | 44.2 |
| Weight (grams) | 92 | 246 | 382 | 698 |

The following table based on the foregoing facts shows the distribution of aromatic olefins and cyclopentadiene in the hexane and sulfolane streams in weight percent of the available amounts of each component in the feed:

| Component | Example 1 Sulfolane fraction Wt. percent | Example 1 Hexane fraction Wt. percent | Example 2 Sulfolane fraction Wt. percent | Example 2 Hexane fraction Wt. percent |
|---|---|---|---|---|
| Cyclopentadiene | 1.0 | 51.2 | 3.2 | 49.3 |
| Styrene | 46.5 | 8.8 | 44.6 | 8.7 |
| Indene | 14.0 | 1.7 | 13.8 | 2.5 |
| Polymerizable olefins | 63.0 | 14.0 | 61.2 | 16.2 |

The cyclopentadiene and methyl cyclopentadiene can be readily recovered from the hexane fraction either by distillation under reduced pressures or by thermal cracking of the dimers and recovering the cyclopentadiene and methyl cyclopentadiene. The latter procedure is more efficient permitting recovery of about 90 weight percent of the available compounds into a fraction containing a minimum of about 92 weight percent cyclopentadiene and methyl cyclopentadiene.

A particular advantage of the present extraction process is the availability of an aromatic olefin fraction useful in the preparation by conventional thermal or catalytic procedures of resinous products having desirable properties.

In these polymerizations, the aromatic olefin fraction obtained from the extraction after removal of the sulfolane by distillation can be used in the preparation of the resinous products. In the alternative a concentrate of one or several selected aromatic olefins can be used. In the case of the dripolene derived feed streams, concentrates containing major amounts of styrene or indene provide excellent resin formers.

In each of these instances it has been found that the aromatic olefins obtained by the extraction process have properties, particularly superior stability to oxidation and ultraviolet light, color and softening point. It further permits control of the polymerization reaction so as to obtain resinous products having the requisite properties.

The thermal polymerizations can be performed by heating the aromatic olefins to a suitable polymerization temperature. This temperature will vary with the identity of the feed, the polymerization time and the requisite properties of the final product. Polymerization temperatures between about 120 and 300° C. are useful, with temperatures between about 150 and 250° C. being preferred. The polymerization may be carried out in the presence of an inert solvent. Useful solvents include aromatic solvents, such as benzene, toluene, etc., and aliphatic solvents such as pentane and hexane.

In the preparation of catalytic polymers a variety of catalysts can be used. In particular, Friedel Crafts catalysts, such as boron trifluoride, aluminum chloride and ethyl aluminum dichloride, aluminum bromide and free radical catalysts, such as benzoyl peroxide, azobisisobutyrontrile, di-t-butyl peroxide, etc. are useful. The amount of catalyst will vary with its identity, the composition of the feed, the polymerization time and the requisite properties of the resinous products. Normally the catalyst is present in amounts from about 0.1 to 5 weight percent of the polymerizable components of the feed. Additional amounts of catalyst can be used.

The polymerization time will vary similarly. Normal polymerization times of from about 0.5 to 6 hours are useful. The polymerization temperature will also vary and normally will be lower than in the production of thermal resins. Temperatures between about 0° C and 150° C. are satisfactory.

In a like manner, a fraction of the aromatic olefins recovered from the aliphatic solvent predominantly composed of indene can be used in the preparation of desirable resins. For most purposes a fraction containing a minimum of about 85 weight percent indene forms preferred resinous products. These products can be prepared by the polymerization techniques previously described for the styrene concentrate.

We claim:

1. A process for the recovery of dicyclopentadiene from a feed stream containing from about 5 to about 50 weight percent of dicyclopentadiene and from about 5 to about 50 weight percent of aromatic olefins and essentially free of components having a boiling point of 110° C or lower which comprises contacting said stream with a sulfolane selected from the group consisting of sulfolane and alkyl substituted sulfolanes in a volume ratio of the feed stream between about 1:1 and about 10:1 and an essentially saturated aliphatic solvent having a boiling point of less than about 140° C. in a volume ratio of the feed stream of between about 2:1 and 10:1 and recovering the dicyclopentadiene by distilling the aliphatic solvent therefrom.

2. A process of claim 1 wherein the sulfolane is sulfolane.

3. The process of claim 1 wherein the sulfolane is an alkyl substituted sulfolane.

4. The process of claim 1 wherein the sulfolane contains from about 2 to about 5 volume percent of water.

5. The process of claim 1 wherein the aliphatic solvent is a hydrocarbon.

6. The process of claim 1 wherein the aliphatic solvent is hexane.

7. The process of claim 1 wherein the feed stream is a dripolene fraction.

8. A process for the preparation of solid resinous products from a feed stream containing from about 5 to about 50 weight percent dicyclopentadiene and from about 5 to about 50 weight percent of aromatic olefins which comprises solvent extracting said stream with a sulfolane selected from the group consisting of sulfolane and alkyl substituted sulfolanes and an aliphatic solvent having a boiling point of less than about 140° C., extracting the aromatic olefins containing a maximum of about 3 weight percent dicyclopentadiene from the sulfolane, polymerizing the aromatic olefins and recovering solid resinous product therefrom.

9. The process of claim 8 wherein the polymerization of the aromatic olefins is thermal.

10. The process of claim 8 wherein the polymerization of the aromatic olefins is performed in the presence of a Friedel Crafts catalyst.

11. The process of claim 10 wherein the Friedel Crafts catalyst is boron trifluoride.

12. The process of claim 8 wherein the polymerization of the aromatic olefins is performed in the presence of a free radical catalyst.

13. The process of claim 8 wherein the aromatic olefins recovered from the aliphatic solvent are distilled prior to the polymerization to a fraction containing a minimum of about 90 weight percent styrene.

14. The process of claim 8 wherein the aromatic olefins recovered from the aliphatic solvent are distilled prior to the polymerization to a fraction containing a minimum of about 85 weight percent indene.

References Cited

UNITED STATES PATENTS

| | | | |
|---|---|---|---|
| 2,953,612 | 9/1960 | Haxton | 260—683.9 |
| 3,179,708 | 4/1965 | Penisten | 260—674 |
| 3,429,804 | 2/1969 | Sze | 208—144 |

OTHER REFERENCES

Petroleum Refiner, vol. 34, No. 2, February 1955, pp. 145–149.

The Oil and Gas Journal, Sept. 23, 1963, pp. 262–264.

JOSEPH L. SCHOFER, Primary Examiner

ROGER S. BENJAMIN, Assistant Examiner

U.S. Cl. X.R.

260—80.78, 88.2, 674